June 19, 1956 — F. E. NULL — 2,751,030
LIGHT SENSITIVE AUTOMATICALLY CONTROLLED STEERING SYSTEM
Filed Nov. 13, 1952 — 4 Sheets-Sheet 1
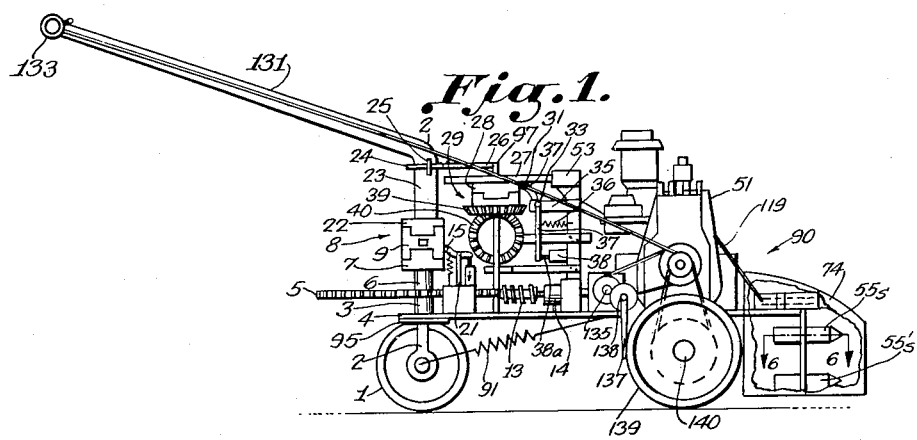
INVENTOR
Fay E. Null June 19, 1956 F. E. NULL 2,751,030
LIGHT SENSITIVE AUTOMATICALLY CONTROLLED STEERING SYSTEM
Filed Nov. 13, 1952 4 Sheets-Sheet 2
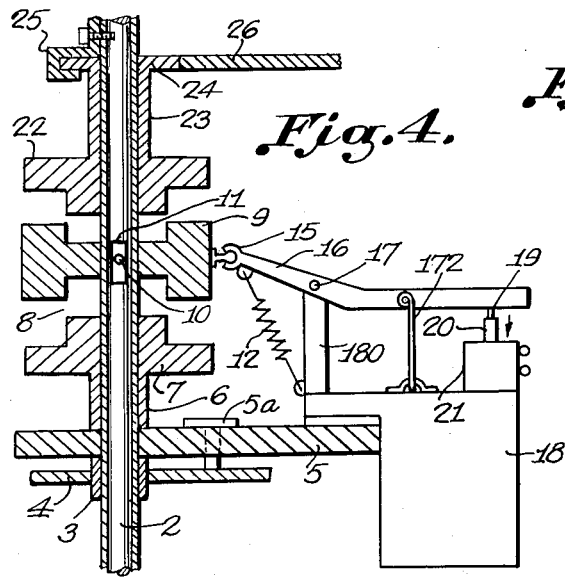
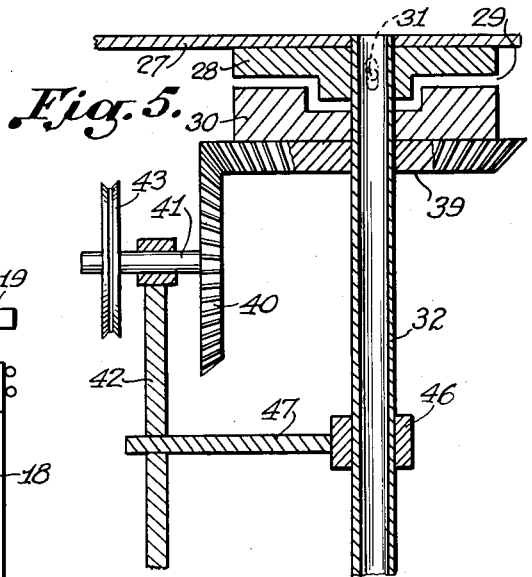
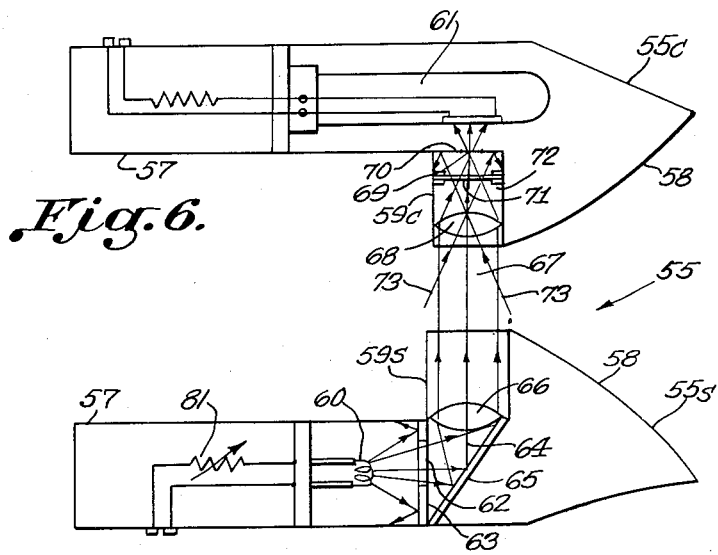
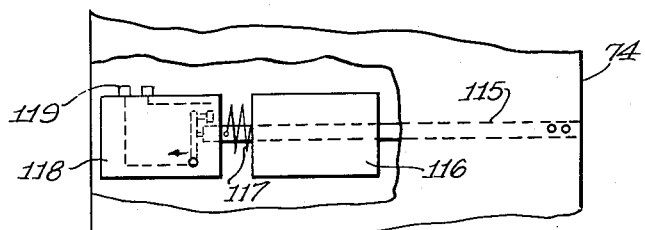
INVENTOR
Fay E. Null

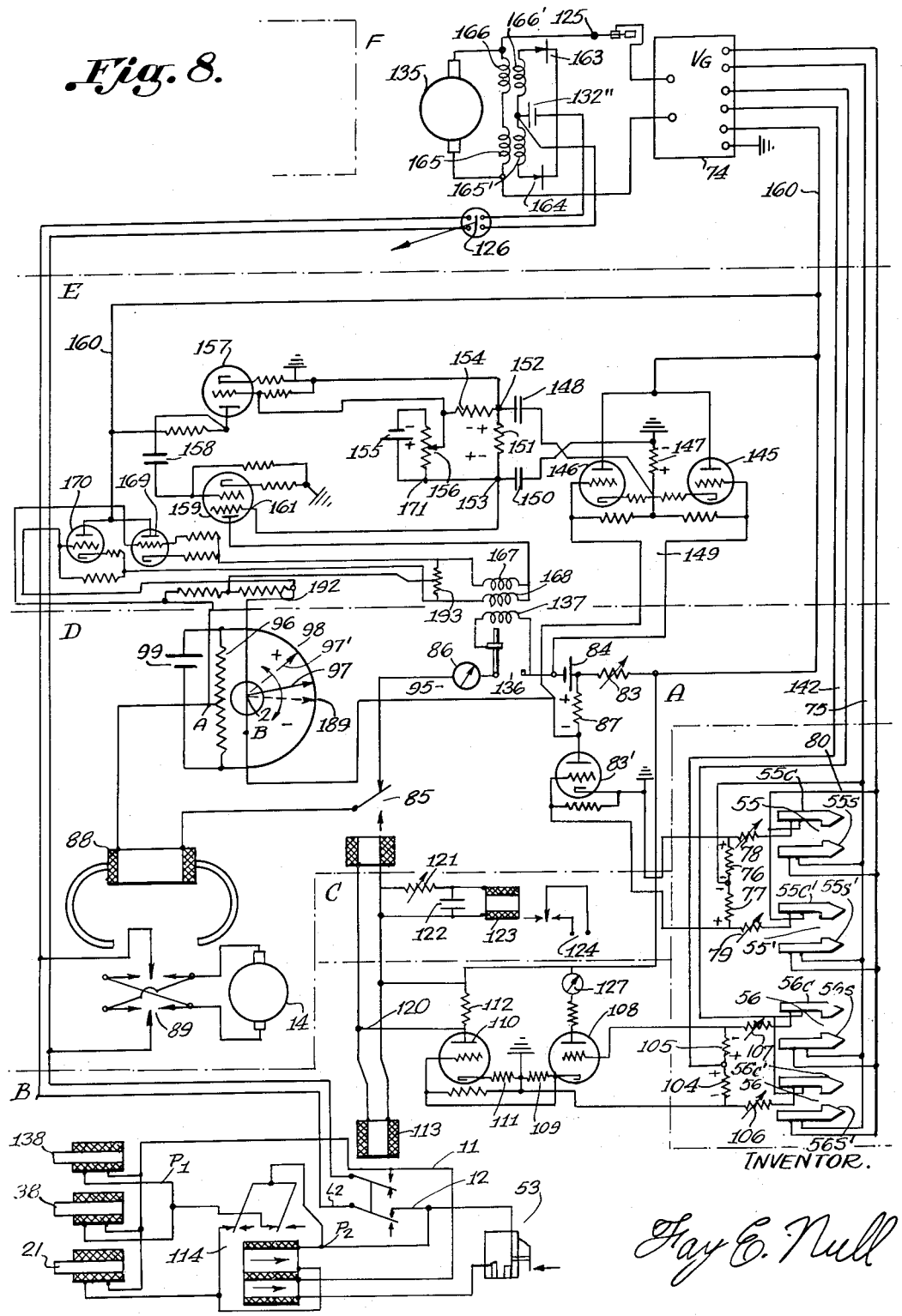

June 19, 1956  F. E. NULL  2,751,030
LIGHT SENSITIVE AUTOMATICALLY CONTROLLED STEERING SYSTEM
Filed Nov. 13, 1952  4 Sheets-Sheet 4
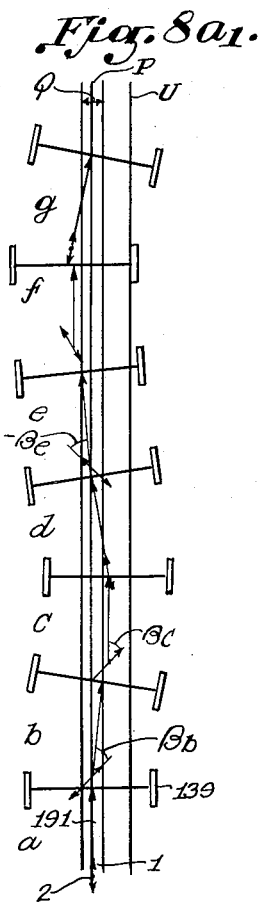
Fig. 8a₁.
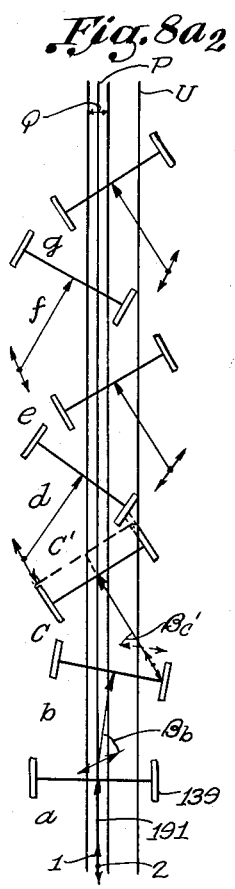
Fig. 8a₂.
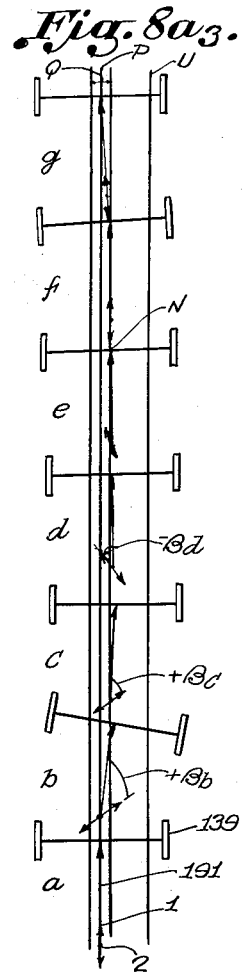
Fig. 8a₃.
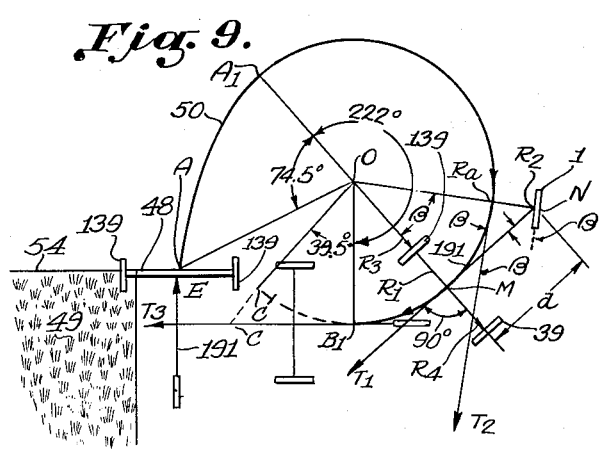
Fig. 9.
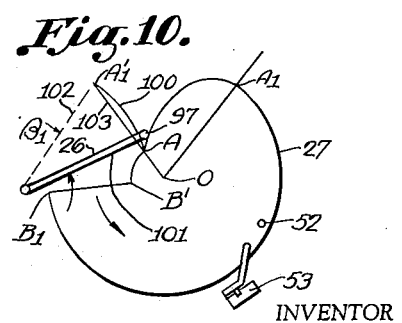
Fig. 10.
INVENTOR
Fay E. Null.

United States Patent Office 2,751,030
Patented June 19, 1956

2,751,030

LIGHT SENSITIVE AUTOMATICALLY CONTROLLED STEERING SYSTEM

Fay Edison Null, Beavercreek Township, Greene County, Ohio

Application November 13, 1952, Serial No. 320,308

11 Claims. (Cl. 180—79.1)

This invention relates to automatically guided harvesters with a sharp boundary between the standing and the cut crop as in the case of combines and power lawn mowers. The attention of one operator is required just to guide a harvester. If guidance were automatic it would reduce the number of operators required, automatic safety guards being used to stop the harvester in case of malfunction or collision.

It is well known that any automatic guidance system is a servo mechanism whose performance depends on the proper combination of selected components. In such servo control systems it is impossible to obtain smooth, stable guidance with an erratic, variable, on and off correction such as obtained by slipping a clutch on a drive wheel in the direction it is desired to turn for course correction.

It is, therefore, among the objects of the present invention to provide automatic guidance for harvesters that will give a smooth, stable control by means of components of a servo system that supply corrections proportional to the errors in the course position.

Another object of the present invention is to provide automatic guidance for harvesters, e. g., power lawn mowers, such that after the operator has hand guided the machine for several initial swaths around the area to be cut, including square corners if convenient, it can be put on automatic guidance to cut the given plot without the presence of an operator.

Another object of the present invention is to provide source-photoconductive cell detector pairs that will give a signal when an infrared beam between the source and cell is interrupted by the edge of the uncut crop in spite of general, bright daylight illumination.

Another object of the present invention is to eliminate the effects of change in the general level of illumination, reflection differences between dry and wet crop blades, changes of voltage and ageing of tubes and components, by bucking the output of one source-photoconductive cell pair that guides on the uncut crop boundary against that of an adjustable reference source-photoconductive cell pair above the uncut crop level.

Another object of the present invention is to use course corrective components with a small detection dead space which allows some course errors before correction occurs, thus preventing incessant reversal and chatter of the corrective equipment and a pronounced zigzag course of the harvester.

Another object of the present invention is the provision for cutting a square corner at the end of an uncut plot by a programmed 270 degree turn.

Another object of the present invention is to provide a shield over the forward part of the harvester, which when pushed back against light spring pressure by an obstruction, will automatically cut the ignition of the driving engine.

Another object of the present invention is to provide a device to stop the harvester after it has cut the last of a given plot.

Another object of the present invention is to provide circuits to function at the corners of uncut plots for an automatic shift from guidance on the uncut boundary to a programmed turn, and on completion of the turn a shift back to guidance on the uncut boundary of the adjoining side.

Another object of the present invention is to provide a corrective deflection of a guide wheel proportional to the positional error of the front of the harvester with respect to the uncut boundary until the error passes through a maximum and starts to decrease, and to provide at this point a guide wheel deflection with respect to the harvester frame equal to that required to maintain the rate of decrease of the error magnitude equal to a fixed reference value, and, thus, to make possible the arrival of both the front and rear of the harvester at their correct track line at approximately the same time with elimination of a rapid, sharply inclined, to and fro hunting of the harvester with respect to the uncut boundary.

Another object of the present invention is to provide a steering device that can not be jolted out of position by ruts or obstructions.

Objects and advantages other than those set forth will be apparent to those skilled in the art from the following description of an application of the present invention to a power lawn mover when read in connection with the accompanying drawings, in which:

Fig. 1 is a side elevation with part of the detector shield broken away to disclose the source-detector cell pairs.

Fig. 2 is a plan view with part of the detector shield removed and some of the gear parts in phantom.

Fig. 3 is a rear elevation.

Fig. 4 is a partial, enlarged vertical section along the line 4—4 in Fig. 2.

Fig. 5 is a partial, enlarged vertical section along the line 5—5 in Fig. 2.

Fig. 6 is an enlarged plan view along the line 6—6 in Fig. 1 of a source-detector cell pair with the top halves of the cases removed.

Fig. 7 shows a portion of the detector shield torn away to disclose the safety stop switch.

Fig. 8 is a schematic of the servo guidance and safety feature circuits.

Figs. $8a_1$, $8a_2$, and $8a_3$ illustrate typical harvester correction paths with respect to the uncut boundary.

Fig. 9 shows a typical programmed turn at the corner of an uncut plot.

Fig. 10 illustrates the shape of the control cam to execute the turn of Fig. 9.

Fig. 11 illustrates the spectral distribution of reflected daylight and radiation from background objects compared with that from the Nichrome coil source.

Referring more particularly to the drawings by characters of reference, reference numeral 1 indicates the guide wheel deflected by shaft 2 in the bearing 3 supported by sheet base 4. Spur gear 5 is attached to cylinder 6, see Fig. 4, and is held against bearing 3 by guide plate 5a. The upper end of cylinder 6 mounts one portion 7 of a clutch 8. The movable section 9 of the clutch 8 slides up and down on the shaft 2 as guided by the pin 10 in slot 11, and is normally held in contact with the portion 7 by the spring 12. The shaft 2 is thus driven by the gear 5 in either direction depending upon the direction of rotation of the worm gear 13 (Fig. 2) as driven by the reversible servomotor 14. The mid-clutch member 9 has a pin and slot connection 15 to lever 16, pivoted at 17 on support 180. (The hook 172 may be used to lock lever 16 and mid-clutch member 9 in the central disengaged position for manual control of the mower.) Lever 16 has a flexible connection 19 to the plunger 20 of solenoid 21 which pulls the end of lever 16 down when actuated, throwing the clutch member 9 out of contact with the lower member 7 whose rotation is controlled by the path correcting servomotor 14, and into contact with the upper clutch member 22 which is attached to cylinder 23 which mounts plate 24 supported from shaft 2 by bracket support 25 through which said plate rotates. Shaft 2 is positioned by the cam follower lever 26 which rides on turn control cam 27 in Fig. 5. Said turn control cam 27 is attached to the upper member 28 of clutch 29, said member 28 rotating on shaft 32 and positioned by pin and slot connection 31 to lever 37 (see Fig. 1) pivoted on bearing 33 on support 35 and normally held up out of contact with lower member 30 of clutch 29 by compression spring 36. Lever 37 is flexibly connected to the plunger 38a of solenoid 38 and its lower end is pulled to the right when solenoid 38 is actuated by a turn signal. This throws the upper clutch member 28 (see Fig. 5) into contact with the lower member 30 which is attached to bevel gear 39 driven by gear 40 from axle 41 supported by a bearing in upright 42 and rotated by pulley 43 driven by belt 44 (see Fig. 2) from engine pulley 45. Shaft 32 of Fig. 5 is carried by bearing 46 in support 47. Thus, when the mower is following the boundary of the uncut plot, clutch 8 drives the shaft 2 and guide wheel 1, and is driven by the gears 5 and 13 and the reversible servomotor 14 controlled by guidance signals to be described later. When the mower 48 (see Fig. 9) clears the uncut grass 49 at the corner of the plot, a turn signal is received by the solenoid 21 (Fig. 1) that unclutches the shaft 2 from the servomotor drive and connects it to the clutch member 22 and the attached cam guide lever 26 to follow the programmed turn 50 as determined by cam 27. Solenoid 38 is also energized by the turn signal and draws the bottom of lever 37 to the right, closing the members of clutch 29 and driving shaft 32 and cam 27 from the bevel gears 39 and 40 which are rotated by the pulley 43 driven by the engine 51. Also the solenoid 138 (Fig. 1) is energized at the start of the turn, pulling in lever 137 to operate clutch 136' (Fig. 2) to disengage drive wheel 139 from its drive axle 140, since both drive wheels can not be driven by a simple axle drive at different speeds. The use of a guide wheel for following an uncut boundary as described in detail later, necessitates a programmed deflection of said drive wheel at a corner turn. When the turn in path 50 has reached the point B₁ the cam follower 26 drops in to a position B' on the cam 27 which gives a straight line path. Also the pin 52 on the cam 27 trips the microswitch 53, solenoid 38 is deenergized and cam 27 is unclutched from the engine driven gear 39. Solenoid 138 is deenergized and clutch 136' is reengaged by a built-in spring to reconnect drive wheel 139 with its drive axle 140. As soon as the uncut grass is reached by the mower, solenoid 21 is deenergized and spring 12 operates clutch 8 to disconnect shaft 2 and guide wheel 1 from the cam follower lever 26, and to connect said shaft 2 and guide wheel 1 to gear 5 and the servomotor 14 for course corrections along the uncut boundary 54.

In Fig. 6 is shown an enlarged view of a source-detector cell pair 55, the other three pairs being identical. The cases of source element 55s and detector cell element 55c have cylindrical portions 57, flared heads 58 to readily pass through grass, and lateral tubular portions 59s and 59c. The source member 55s contains the Nichrome coil 60 and variable resistor 81 to control the temperature of said Nichrome coil for a peak radiation for a wave length of infrared to which the lead sulphide cell 61 in said detector cell element 55c has a peak response, e. g., at 2.2 microns. In order to reduce radiation scattered from lens 66 the infrared radiation from the coil 60 is limited by the aperture 62 in the screen 63 to rays such as 64 that after reflection from the mirror 65 are incident upon lens 66. A glass lens transmitting out to 2.8 microns may be used. The lens 66 is at the focal distance from the coil 60 and since said coil 60 acts approximately as a point source, the rays 67 leave the source element 55s as an approximately parallel beam. The lens 68 brings the parallel rays 67 to a point focus at the focal distance of the lens, the aperture 69 in the screen 70 being positioned at said focal point. Diffusely reflected rays such as 73 making an angle to the rays 67 fall on points of the screen 70 removed from the aperture 69 and are reflected back and forth until absorbed by the blackened interior wall 72 of the tubular case section 59c. Lampblack paint which absorbs visible light is also a good absorber of the 2 to 3 micron wave length range infrared detected by the cell 61. The above device has the advantage of discrimination against diffuse daylight illumination which is in general very much stronger than artificial illumination. Illumination by diffuse daylight (excluding sunlight) may be of the order of 2200 foot candles at noon, while artificial light may often be less than 10 foot candles. It is, therefore, necessary to use special means to keep the diffuse daylight from swamping the articial source it is desired to detect. Daylight peaks in the ultraviolet at wave lengths (about 0.29 micron) shorter than the edge of the visible spectrum at approximately 0.4 micron, while the lead sulphide cell peaks at about 2.2 microns. The infrared contained in the 2 to 3 microns lead sulphide range is thus much less for the reflected daylight than for the Nichrome coil, as illustrated in Fig. 11. The tube section 59c looks into the tubular section 59s so that rays 73 with origin outside of 59s must make an angle to the parallel rays 67 in order to enter said tubular section 59c. Hence, these rays 73 do not come to a focus at the aperture 69 but are absorbed by multiple reflections from the blackened inner surfaces of screen 70 and blackened inner surfaces of tubular section 59c. The cell 61 must receive, however, all rays from the mirror 65 that become parallel to rays 67 after refraction by lens 66 or that are radiated from lens 66 parallel to rays 67. The radiation from said lens 66, mirror 65, and lens 68 peaks in the long wave length infrared, about 9 microns for a tempreature of 80 degrees F., and as shown in Fig. 11 only a small fraction of this radiation has the wave length at which the Nichrome coil has peak response. Since, for typical conditions, the diffusely reflected daylight from said lens 66, mirror 65, and the grass between said source element 55s and said receiver element 55c, peaks at about 0.29 micron, said lead sulphide cell 61 with infrared detection peak in the 2 to 3 microns range only receives a small fraction of the radiation from said diffusely reflected daylight and radiated infrared from low temperature objects seen by said cell 61. The filter 71 is used to still further discriminate against the remaining short wave length infrared in reflected daylight which falls in the wave length range to which the lead sulphide cell is sensitive. This elimination of the effect of the internally radiated and diffusely reflected radiation, other than that from said coil 60, combined with the elimination of the rays making an angle to parallel rays 67 as described above, and the use of a filter to discriminate against shorter wave lengths makes it possible to detect the obstruction by grass of part of the radiation from the Nichrome coil, in spite of the fact that daylight illumination on lens 68 may be very much greater than the infrared illumination from said Nichrome coil. The shield 74 protects said source-detector cell pairs from direct sunlight.

Fig. 8 shows the schematic of the electronic circuitry for the automatic guidance features. For purposes of illustration the circuits have been separated according to function by dashed lines. Thus, section A shows the position detector circuits, section D the follow-up potentiometer and guide wheel positioning circuit, section B the relays and solenoids actuated for conversion from boundary guidance to a programmed corner turn, section C the safety delay relay circuit for stopping the mower, section E the rate circuits to add a bias to the error signal in section D to maintain a decrease in the magnitude of the error voltage at a fixed reference value, and section F which shows the power supply.

In section A the source-detector cell pairs 55 and 55' furnish guidance signals for the mower to follow the edge of the uncut grass plot. Source detector cell 55 is above the uncut grass and directly above the source-detector cell pair 55', the uncut boundary passing in a median position between said source element 55s' and the detector cell element 55c' of source-detector cell pair 55'. The voltage source $V_G$, section F, is conducted by leads 75 to the Nichrome coils of source elements 55s, 55s', 56s, and 56s' in parallel, the resistor 81 of each source (Fig. 6) being adjusted to produce the proper temperature of said Nichrome coil, 885 degrees C., to peak the radiation in the 2 to 3 micron lead sulphide detector cell range. The voltage $V_G$ is also conducted by leads 80 across two parallel paths, i. e., resistor 76, variable resistor 78, and detector cell element 55c in series in one path, and resistor 77, variable resistor 79, and detector cell element 55c' in series in the other path. The IR drop across resistors 76 and 77 thus are bucked in polarity, the difference being impressed across the grid and cathode of the tube 83', section D. Source-detector cell pair 55 is above the uncut grass, and source-detector cell pair 55' is close to the ground with a correct position in which the boundary of the uncut plot is in a median position between the source element 55s' and the detector cell element 55c'. The resistors 78 and 79 are then adjusted for zero input on tube 83'. Resistor 83, section D, has been previously adjusted with zero input on tube 83' until the IR drop on resistor 87 balanced the bucking battery 84 so that with switch 136 in the downward position and the contacts of two position relay 85 normally closed by the spring action of its blades, meter 86 indicated zero current. If then the boundary of the uncut plot varies from this reference position between the elements of source-detector cell pair 55', the IR drop across resistors 76 and 77 will no longer balance, and either a positive or negative voltage will be impressed on the grid of tube 83' with respect to its cathode. (For the purposes of illustration, the function of the circuit in section D will be first described with the switch 136 in the horizontal position so that the guidance function is unaffected by the action of the circuit in section E. The effect of the circuit in section E will be described later.) A corresponding positive or negative voltage will appear across the leads 95, this voltage being bucked against the follow-up voltage on potentiometer 98 across points A and B as determined by the position of the rotating contact 97 mounted on the guide wheel shaft 2 and guide wheel 1 in a direction to bring this unbalance to zero. That is, the displacement of the potentiometer contact 97 from the zero voltage position 189 (and, therefore, the shaft 2 and guide wheel 1 to which it is attached) will be proportional to the error signal voltage on leads 95. Thus if the uncut boundary extends more than half of the distance from the detector cell element 55c' to the source element 55s', its resistance increases, the current in resistor 77 becomes less than in resistor 76 and a negative voltage is impressed across the grid of tube 83' with respect to the cathode. The bucking battery 84 then has a greater voltage than the IR drop across resistor 87 and the bottom lead of the pair 95 is positive. The leads 95 are in series with the meter 86, the two position relay 85 (which is closed for guidance on the uncut boundary), polarized relay 88, and the pickoff points A and B on the follow-up potentiometer 98. In the present example the signal voltage from leads 95 tends to make current flow from B to A inside the potentiometer, while the voltage pickoff from the potentiometer tends to make the current flow from points B to A through leads 95. If the position of the guide wheel 1, shaft 2, and wiper contact 97 lags the value proportional to the error voltage on leads 95 corresponding to the position of the dotted arrow 97', the potentiometer voltage will be the smaller, and current will flow up through point B and down through point A and the polarized relay 88. This causes contacts 89 to close in the left hand position which starts the servomotor 14 in the direction to rotate shaft 2 counterclockwise, and hence, contact wiper 97 is moved in the upward direction until the potentiometer voltage across points B—A is equal and opposite to that across leads 95. Then the contacts 89 are pulled to the middle position by the spring action of the switch blades. The counterclockwise rotation of the shaft 2 in Fig. 8 corresponds to a deflection of the front of the guide wheel 1 toward the uncut plot causing the mower to turn out. As the deflection of the guide wheel 1 continues to change the path of the mower to decrease the position error of the mower with respect to the uncut boundary and, hence, decreases the error signal voltage on leads 95, the voltage on points B—A becomes larger than that on leads 95, and current flows down from point B, through leads 95 and the meter 86, and through the polarized relay 88 causing the contacts of 89 to close in the right hand position which drives the servomotor 14 in a direction to rotate the guide wheel 1 back toward zero deflection as the shaft 2 and contact wiper 97 move down in a clockwise direction until the pickoff voltage across points B—A of the potentiometer is equal and opposite to the voltage error signal across leads 95, and zero current through the polarized relay 88 allows the contacts of the switch 89 to spring back to their central position. Thus with switch 136 in the horizontal position the guide wheel 1 has an error proportional to the error signal voltage, and the error signal and guide wheel deflection approach zero value coincident with the attainment by the front of the mower of its on course position. The above circuit thus converts the positional error of the front end of the mower with respect to the boundary of the uncut grass to a proportional voltage which is bucked against a potentiometer voltage which is proportional to the corrective deflection of the guide wheel 2. The resultant difference in voltage actuates the relay 88 to drive servomotor 14 in a direction to make the above voltages equal, which insures that the corrective deflection of the guide wheel is at all times proportional to the positional error of the front of the mower with respect to the boundary of the uncut plot. This feature of proportional control allows a smooth corrective action without overshoot for the position of the front end of the mower.

In the interests of simplification the servomotor 14 that rotates the guide wheel 1 until its deflection is proportional to the position error of the mower does not have a torque proportional to the difference between the error voltage signal and the voltage across points A and B of the follow-up potentiometer 98. This saves the use of a power amplifier, the servomotor 14 being cut in or out as required by the relay 89. The ground friction effectively damps the motion of the guide wheel 1, so that there is only a small overshoot and the guide wheel 1 executes a slow oscillation about a deflection angle proportional to the mower position error. This oscillation does not reverse the sign of the deflection of the guide wheel correction with a corresponding zigzag motion of the mower, but merely introduces a small, slow variation in the guide wheel deflection amplitude that introduces a small wave motion in the trace of the mower path.

An attempt to eliminate the need for a guide wheel by the slipping of clutches on the right and left drive wheels for guidance would be an on and off correction without proportional control. Since clutches give a non-reproducible reaction due to erratic friction and wear, the mower would have a sharp zigzag series of corrections that would cut an uneven path and might well lead to instability of the servo guidance loop. Excessive clutch wear would occur for friction clutches and magnetic clutches with a coupling solution of ferromagnetic particles are too expensive. The use of a guide wheel is, thus, required.

In general the best operation will not be secured with switch 136 in the horizontal position. Giving the guide wheel a deflection proportional to the positional error of the front end of the mower does not insure the correct position of the rear of the mower. Typical resultant motions are indicated in Figs. 8$a_1$, 8$a_2$, and 8$a_3$, in which the uncut boundary is indicated by the lines U and the loci of the correct positions of the front of the mower by the lines P. Fig. 8$a_1$ shows the type of path followed with switch 136 in the horizontal position for consecutive positions "a" through "g." In position "a" the mower axis 191 is in the correct position with respect to the uncut boundary U. In position "b" the positional error is greater than one half Q (the dead space passed through before an error is detected), and the guide wheel 1 is deflected by an angle $\beta_b$. At "c" the positional error has reached a maximum with a corresponding guide wheel deflection angle $\beta_c$. At "d" the positional error and guide wheel deflection angle are both zero, but the rear end of the mower is displaced to the right and the mower is aimed into the uncut grass. This causes an error of the opposite sign at the next position "e," and a corresponding deflection of the guide wheel 1 by angle $-\beta_e$. At "f" the negative error has reached a maximum with a corresponding maximum guide wheel deflection. At "g" the positional error of the front end is again zero, with zero deflection of the guide wheel, but the rear end of the mower is now displaced to the left and the mower is aimed across the uncut boundary to cause an error to the right. Thus, with the hand switch 136 in the horizontal position, the mower tends to oscillate about the uncut boundary at an amplitude equal to the disturbance of its path caused for example by a change in direction of the uncut boundary.

While this type of path is not satisfactory for uncut boundaries with rapidly changing curvatures (exclusive of the corners which will be considered later) it is much superior to the type of path followed if the correction were not proportional to the error. Fig. 8$a_2$ shows the type of path obtained if the correction has the same value regardless of the amount of error. In this case, even though the error is small as at "b," the maximum deflection of the guide wheel occurs since it must be large enough to take care of the largest positional error that might occur as by a rapid change in curvature of the uncut boundary. This large deflection of the guide wheel 1 causes the rear of the mower to be displaced far to the right as at "c," even though the positional error of the front end is zero and the guide wheel has zero deflection. The mower is aimed into the uncut plot at a sharp angle and when the front end continues a little to the left as in the dotted line position "c'," the guide wheel immediately has full deflection in the negative direction as indicated by the dotted arrows. As the mower is aimed across the zero error line P at a sharp angle and its rear end is widely displaced from that line, the front of the mower acquires a large error before it can turn parallel to the line P. The rapid turn then continues until the line P is reached, and by this time the mower is again aimed at a sharp angle across the lines P and U with its rear end again widely displaced from the zero error line P, so that the strong oscillation of path is continued. Fig. 8$a_3$ illustrates the type of path obtained with the hand switch 136 in the vertical position. For increasing error of either sign as in position "b," the deflection $\beta_b$ of the guide wheel 1 is proportional to the error $e_b$. When the absolute value of the error has started to decrease as in position "d," the magnitude of its rate of decrease (regardless of sign), expressed as a voltage, is compared with a standard reference voltage, and the rate of decrease in error maintained equal to the standard value. Thus, in position "e" the rate of decrease in error is too large and the guide wheel 1 has been given a negative deflection which brings the rate of decrease in error back to a value somewhat less than that given by the average course between positions "e" and "g." The result is a slight hunting of the front end of the mower about the average slope of the course from "e" to "g." The reference voltage that controls the rate of decrease of error is adjusted so that the length of course line "e" to "g" is long relative to the positional error, and when the mower reaches the correct path P, it makes only a small angle to said path P and travels a relatively large distance before the zero correction region between the lines Q on both sides of line P is reached and crossed, and a correction is applied to the guide wheel in the opposite direction. At the point N the front of the mower crosses the right hand line boundary of the region Q about the line P for which the correction current is not great enough to keep the switch blades of relay 89 from going to their neutral position for which there is no voltage on servomotor 14. The guide wheel keeps the deflection it has when the right hand boundary of Q is reached until the left hand boundary of Q is reached and a correction is obtained in the opposite direction. Thus, any increase in error causes a strong deflection of the guide wheel 1 in a direction to decrease the error. As soon as the magnitude of the error starts to decrease, the rate of decrease of the magnitude of the error is made to approximately follow a fixed, small slope to cause the front and rear of the mower to reach the path P at approximately the same time in a smooth, stable glide. The rapid correction for increasing magnitude of error limits the error to small values, and the slow, gradual correction during decreasing magnitude of error provides stability and prevents excessive hunting about the correct path P.

The circuit in section E, Fig. 8, holds the rate of decrease in error magnitude to the desired value. The error voltage appears on leads 149 and is impressed on the grids of tubes 145 and 146, one tube conducting for a positive and the other for a negative polarity of the error voltage so that the output on resistor 147 has the same polarity regardless of the polarity of the error voltage on said input leads 149. Said output resistor 147 thus has an IR drop that measures the magnitude of the error voltage and is independent of the error voltage polarity. Tubes 146 and 147 are biased for operation on the linear part of their characteristics and any change of voltage on leads 149 produces a proportional voltage on resistor 147. The IR drop on said resistor 147 is impressed on the differentiating circuit comprised by, condenser 148, resistor 151, and condenser 150, the rate of change of the magnitude of the error voltage appearing across points 152 and 153. This voltage across points 152 and 153 is bucked against that of a reference voltage on potentiometer 156 produced by battery 155. For decreasing magnitude of error voltage the bottom ends of resistors 156 and 151 will both be positive and the polarity impressed on resistor 154 will have one sign when the voltage on resistor 151 is the larger, and the opposite polarity when the voltage picked off from resistor 156 is the larger. The IR drop across said resistor is impressed across the grid and cathode of tube 157 whose output is coupled to the tube 159 through condenser pickoff 158. The plate supply of the tube 159 is provided through primaries 167, and 168 of transformer 137, being wound in the opposite sense so that voltages of opposite polarity are impressed across switch 136 when the plate current to the tube 159 is drawn through a different primary of transformer 137. Tubes 169 and 170 receive their plate supply from lead 160 and are in series respectively with primaries 167 and 168. Tubes 169 and 170 thus act as selector tubes that determine which of said primaries 167 or 168 draws the largest current, and hence determines the polarity of the induced bias voltage on terminals 136. The voltage bias impressed across switch 136 is in series with the error voltage from resistor 87 and battery 84 that is impressed on points A and B of the follow-up potentiometer 98, and is of the proper polarity to correct the deflection of the guide wheel 1 by means of switch 88 and servomotor 14 so that the magnitude of the error decreases as the reference rate determined by potentiometer 156 of section E. It is necessary to change the polarity of the bias voltage on switch 136 when the error voltage changes polarity so that the correction bias on switch 136 from section E for rate of decrease in error magnitude will have the same sense with respect to change in error magnitude regardless of the error voltage polarity impressed on potentiometer 98. In section D the voltage of point A relative to point B of the follow-up potentiometer 98 is negative when the axle 2 of the guide wheel 1 is deflected in a counterclockwise direction from the midpoint 189 (corresponding to deflection of the front of the guide wheel in a counterclockwise direction when looking down on the wheel), and positive for a clockwise deflection from said midpoint. This voltage across points A and B is impressed across the resistor 192 whose ends are connected to the grids of the tubes 169 and 170 and whose midpoint is connected to the midpoint of resistor 193 which is in series with the cathodes of tubes 169 and 170. Thus, when point B is positive to point A, tube 170 conducts more while tube 169 is forced toward cut-off, and primary 167 passes more current than primary 168, so that the polarity of the voltage induced across terminals 136 (when the impedance of tube 159 is varied), is then determined by which of the tubes 169 or 170 has the larger plate current as determined in turn by the polarity of the voltage across points A and B and the sign of the deflection of guide wheel 1. If the magnitude of the error is increasing too rapidly so that the voltage across the resistor 151 (positive at the bottom) is greater than that picked off resistor 156, the grid of tube 157 will become more positive, the current through tube 157 will increase and that through 159 will decrease. The sign of the deflection of the guide wheel 1 determines which coil 167 or 168 will have the greater decrease in current. In either case it is desired to reduce the deflection of the guide wheel so as to reduce the rate of reduction of the error magnitude. If the deflection of the guide wheel is positive, counterclockwise in Fig. 8, point B will be positive with respect to point A, tube 170 will draw more current than tube 169, and coil 168 will have the larger decrease in current, its winding sense being such that a voltage is induced on terminals 136 with a polarity to make the voltage on leads 95 (lower lead positive) smaller than on points B and A which as previously described causes an unbalance current to flow out of terminal B to actuate relay 88 and servomotor 14 to rotate the guide wheel and attached arm of potentiometer 98 toward the mid-point 189. If the deflection of the guide wheel is negative, clockwise in Fig. 8, point B will be negative with respect to point A, tube 169 will draw more current than tube 170, and coil 167 will have the larger decrease in current, its winding sense being such that a voltage is induced on terminals 136 with a polarity to make the voltage on leads 95 (lower lead negative) smaller than that on points B and A which causes an unbalance current to flow into the potentiometer at B to actuate relay 88 and servo motor 14 to rotate the guide wheel and the attached arm of potentiometer 98 toward the mid-point 169. Thus, regardless of the deflection of the guide wheel, too large a rate of reduction of the error magnitude will decrease the deflection of the guide wheel until the rate of reduction of the error magnitude is reduced to the reference value.

When the error is increasing it is desired that the voltage impressed on terminals 136 be blanked out. When the error is increasing the voltage on point 153 is negative with respect to earth and the negative bias on grid 161 of tube 159 forces it to cut-off.

When the front of the mower clears the uncut grass at a corner the source-detector cell pair 56' initiates a signal that energizes the solenoids 138, 21, and 38. As previously described solenoid 138 disengages the right hand drive wheel from its driving axle, and solenoid 21 shifts the connection of the shaft 2 and guide wheel 1 from the correction drive of the servomotor 14 to that of the lever 26 as positioned by the pin 97 riding on the turn program cam 27. The cam 27 is then connected to the engine drive by clutch 29 as energized by solenoid 38. The mower is propelled forward entirely by the left hand drive wheel, the angle of turn being determined by the deflection of the guide wheel, which because of its long lever arm effectively controls the direction of motion. The mower is propelled forward in the same manner as a flanged wheel vehicle on a track driven by one wheel, the equivalent curvature of the track being supplied by the guide wheel. Figs. 9 and 10 illustrate a typical turn. When the mower is on its programmed turn course the axis 191 which perpendicularly bisects the axle of the drive wheels 139, extends the distance $d$ to the guide wheel 1, said axis M—N being coincident with the tangent $T_1$ to the turn curve at the point M. Under these conditions the on course turn position of the guide wheel 1 is parallel to the tangent $T_2$ drawn perpendicular to the radius $R_a$ (of the circle with center at point O and passing through point M), which passes through the point N when extended. Then each wheel of the mower would be tangent to concentric circles about the point O whose radius vectors $R_2$, $R_3$, and $R_4$ are determined by the value of $R_1$ at the given point M, and the radius vector to each wheel will have the same angular velocity. For a given radius vector $R_1$ at a given point M on the programmed turn course 50, the deflection angle of the guide wheel 1 is given by $\beta = \tan^{-1} d/R_1$. The lever 26 is attached to the shaft 2 that holds the guide wheel 1 at such an angle that the mower is on a straight course when pin 97 is at point A on cam 27 corresponding to the position A on the turn course 50. Then as the cam 27 is rotated at an angular velocity equal to that in the turn course 50, the cam 27 pushes the pin 97 outward along the arc 100. The angle by which the lever 26 is displaced outward from the position A is equal to the deflection angle $\beta$ of the guide wheel 1, and is equal to the length of displacement along the arc 100 (measured from point A) divided by the length of lever 26. Practically the difference in length of chord 103 and the arc 100 is sufficiently small that angle $\beta$ may be taken as equal to displacement distances along the chord 103 divided by the length of lever arm 26. To obtain the desired deflection angle $\beta$ at some point $A_1$ on the turn course 50 it is only necessary to provide a cam with a radius vector OA for the straight line course, $\beta = 0$, such that when OA is subtracted from $OA_1'$ and the difference divided by the lever arm 26, the angle $\beta$ is obtained. Thus, for the lever 26 in position 101 with the pin 97 at point A the mower would be on a straight line course corresponding to point A on the turn course. When the turn has programmed to the point $A_1$ on the turn course 50, the cam 27 will have rotated counterclockwise and pushed the pin 97 out to the position $A_1'$ and the lever arm 26 has been displaced an angle $\beta$ to the position 102, where $\beta$ is equal to the deflection angle $\beta = \tan^{-1} d/R_1$, where $R_1$ is the radius of the 222 degree circle from the position $A_1$ to $B_1$. When the position $B_1$ on the turn course 50 is reached, it is desired that a straight line course be continued, and the pin 97 drops from the position $B_1$ to B' under the action of the return spring 91 on the guide wheel 1. The point C is reached on the turn path 50 when the point A is reached on the cam 27 (the length of $B_1C$ being equal to that of the arc $B_1C'$ which determines the angle through which the cam rotates). The cam 27 is then in position for the next turn cycle and pin 52 makes a contact through microswitch 53 that deenergizes solenoids 38 and 138, allowing clutch 29 to disengage cam 27 from the engine drive and permitting clutch 136' to reengage the right hand drive wheel 139 with its driving axle 140. The mower then continues along the straight line course until the source-detector cell pair 56' strikes the uncut grass 49. As previously described a signal is then generated to deenergize solenoid 21, and the clutch 8 then connects the shaft 2 and the guide wheel 1 to the correction drive of the servomotor 14 in order to follow the boundary 54 of the uncut plot. Thus, the source-detector cell pair 56' gives a signal when the mower passes out of the uncut grass that initiates a programmed turn in which the deflection angle of the guide wheel 1 is equal to $\beta = \tan^{-1} d/R_1$ which turns the mower into position for cutting along the next side of the uncut plot and then continues in a straight line. As soon as the mower hits the uncut plot the source-detector cell pair 56' initiates a signal to return the guide wheel 1 to control by the corrective drive of the servomotor 14. This combination of boundary follower guidance with an automatic transfer to a programmed turn at a corner, followed by an automatic transfer back to boundary follower guidance, takes advantage of the fact that most grass plots are roughly rectangular in shape, and the automatic guidance feature can be used after only a few swaths have been cut by hand guidance. A circular plot of fair size could be tracked by the boundary follower guidance without the programmed turns for square corners. It would, however, require a much greater amount of preliminary manual guidance to form the circular plot of uncut grass. The programmed turn only occurs when the mower runs out of uncut grass. Automatic shut down features will be explained later.

The electric circuits for the automatic programmed turns are shown schematically in sections A and B of Fig. 8. The outputs of source-detector cell pairs 56 and 56' are bucked against each other across resistors 105 and 104, and the difference impressed against the grid and cathode of tube 108. Variable resistors 107 and 106 are adjusted with both source-detector cell pairs 56 and 56' out of the uncut grass for equal IR drops on resistors 105 and 104 and zero input voltage on tube 108, which is of a type which passes a large plate current in the absence of negative grid bias. When the mower is guided along the boundary of the uncut plot, grass is between the elements of the source-detector cell pair 56' and the current through the resistor 104 is decreased, the voltage across the resistor 105 predominates, and a negative bias drives tube 108 to cutoff. When the mower runs out of uncut grass at a corner, the source-detector cell pair 56' draws a current equal to that of source-dedector cell pair 56, the voltages across resistors 104 and 105 are equal, the negative signal input is removed from tube 108 and it passes a large current. The positive voltage drop from resistor 109 is then impressed on the grid of tube 110. Tube 110 is normally biased by the voltage on resistor 111 to too low a value of plate current to actuate the two position relays 85 and 113 from the leads 120 by the IR drop across resistor 112. When the tube 110 receives a positive signal from resistor 109 its plate current is increased to give a sufficient voltage across resistor 112 to actuate relays 113 and 85. Relay 85 breaks the circuit through polarized relay 88 which allows the blades of 89 to spring back to their central, open position, effectively opening the circuit of the servomotor 14 and preventing any motion of its corrective drive through the gear 5 and the bottom element 7 of the clutch 8. (The clutch element 7 is disconnected from the middle clutch element 9 in a corner turn but power is saved and heating prevented by disconnecting voltage from the servomotor 14 and its control relay 88. Relay 113 connects the power circuit to solenoids 21, 38, and 138, the contacts of relay 114 being normally closed to the left hand position by spring action. Solenoid 21 operates clutch 8 to disconnect the shaft 2 and guide wheel 1 from the corrective drive of servomotor 14, and connects said shaft 2 and guide wheel 1 to the turn program cam 27. Solenoid 138 disengages clutch 136' thus, disconnecting the right hand drive wheel 139 from the drive axle 140. Solenoid 38 engages clutch 29 with cam 27 from the engine drive. Cam 27 then gives the required deflection angle to the guide wheel 1 to obtain the desired turn curve 50. Upon completion of said turn 50, pin 52 on cam 27 momentarily closes microswitch 53 and a current pulse flows through the lower coil of relay 114 opening its contacts. No current flows through the upper coil of relay 114 until microswitch 53 is closed, as the path through said upper coil is shorted out by the parallel path through the switch contacts of relay 114. This deenergizes solenoids 38 and 138, so that spring 36 disengages clutch 29 disconnecting cam 27 from the engine drive, and clutch 136' reengages the drive wheel 139 with the drive axle 140. It is necessary, however, that solenoid 21 be energized so that clutch 8 does not reengage axle 2 with the guide wheel 1 until the uncut grass is again encountered and relay 113 is opened. The opening of relay 114 changes the flow of current to relay 21. Before relay 114 opens the current flows from the upper contact of relay 113 through solenoid 21, through the closed left hand contact of relay 114 to lead $P_2$ and line $L_2$. After relay 114 is opened by the momentary pulse through the lower coil from the microswitch 53, the current flows from the upper contact of relay 113 to lead $P_1$, through solenoid 21, through the upper coil of relay 114 to $L_2$. Thus, relay 114 is locked open as long as relay 113 is closed regardless of the opening of microswitch 53, and this prevents energizing solenoids 138 and 38 with the corresponding activation of clutches 136' and 29, so that the right hand drive wheel is again under power drive and cam 27 can not move until relay 113 is opened and then reclosed at the next turn, the guide wheel 1 being held on a straight course by lever 26 and cam 27. This condition persists until the mower hits the uncut grass; then the grass obstructs light passage between the elements of the source-detector cell pair 56', the resistance of element 56c' increases, the voltage on resistor 104 decreases again, the negative voltage on resistor 105 predominates, and a negative bias blocks tube 108 to cut-off. This decreases the input on tube 110 to zero and its normally negative bias decreases its current to a point where the two position relay 113 opens, and the solenoid 21 is deenergized so that clutch 8 disconnects the shaft 2 and guide wheel 1 from the control of cam 27 and connects it to the guidance drive of servomotor 14. The coil of relay 85 is also deenergized so that the contacts of relay 85 close by spring action and the circuit through relay 88 is again completed for guidance control along the boundary of the uncut plot. The opening of relay 113 has opened the circuit of two position relay 114 whose contacts now rest against the left stops by spring action in readiness for the next programmed turn.

As shown in Fig. 7 the guard 74 protects personnel and shrubs from damage by the mower in case the operator midjudges the time for the mower to cut to a given position or in the case of occasional malfunction of components. The guard 74 is mounted on bar 115 which slides in guide 116, restrained by weak spring 117 which is only strong enough to prevent stretching by the push of the grass in contact with the guard 74 so that a small force of collision will drive the bar 115 against the microswitch 118 breaking the circuit of the leads 119 which are in series with the line to the engine ignition system, so as to stop the mower quickly upon collision.

Likewise, the mower is automatically stopped when it runs out of uncut grass as upon completion of cutting of a plot of uncut grass before the time anticipated by the operator. When the mower runs out of uncut grass the automatic turn program signal is received on leads 120 (section B of Fig. 8) from the output of tube 110. The relay 123 (section C of Fig. 8) has a time delay circuit in its input composed of the condenser 122 charged through the variable resistor 121, which is adjusted to make the time constant of this input circuit longer than the time, e. g., 3 seconds, normally required for a programmed turn. If the turn is completed within this time so that uncut grass again appears between the elements of the source-detector cell pair 56' before high resistance relay 123 opens, the voltage on leads 120 is removed, and the charge on condenser 122 leaks off through the relay coil allowing the engine ignition circuit to close through relay 123. If the mower does not hit grass within the 3 second turn time, relay 123 opens, and the leads 124 in series with the engine ignition circuit are opened. The mower then remains immobile until the operator opens the hand switches 125 and 126 (section F, Fig. 8) disconnecting the automatic control circuits for relay 123 and the servomotor 14 correction drive from the power line. Then after lifting the middle portion 9 of clutch 8 to a neutral position (see Fig. 4) and locking by hook 172, the mower may be taken to the desired cutting location under manual control. When the mower again encounters uncut grass the switches 126 and 125 are closed for automatic operation.

For calibration of the source-detector cell pairs the switch 126 is opened but switch 125 remains closed. The engine clutch is disengaged from the drive. With the boundary of the uncut grass plot median between the elements of the source-detector cell pair 55', the resistors 78 and 79 are varied for zero current through meter 86. Likewise with uncut grass between the elements of the source-detector cell pair 56', resistors 107 and 106 are adjusted until the current through meter 127 is zero, thus preventing a sufficiently high voltage on relay 113 for its operation as long as uncut grass is in front of the mower at the position of the source-detector cell pair 56'. The adjustment rheostats 78, 79, 106, and 107 and the meters 86 and 127 have readily accessible knobs on top of the electronic control box 132 which shields the radio tubes and components of Fig. 8. Switch 125 is alongside the above resistor controls, and the two pole pull cord snap switch 126 is operated by the wire 128 that connects with the finger control lever 129 on the mower handle. Thus, if one desires to change from automatic guidance to manual control, it is only necessary to apply finger tip pressure to lever 129 which opens switch 126, thus, cutting off all power deflection of guide wheel 1. One may then lock clutch 8 in the neutral position without danger of being buffeted by the handle 131 that is attached to the axle 2 and controls the position of the guide wheel 1. The tip 132' of the handle 133 is made of soft rubber to prevent injury to the operator if he should attempt to seize the mower at a corner when it has a programmed turn. During the initial manual operation of cutting several swaths around the perimeter of the uncut plot, switch 125 should be opened to save battery 132" from the current drain of the electronic circuitry.

As shown in sec. F of Fig. 8, the battery 132" for the solenoid and servomotor power source needs to be only large enough to take care of the starting load, since it is continuously charged by a conventional full wave rectifier circuit from the A. C. generator 135 driven by the gasoline engine 51 and consisting of rectifiers 163 and 164, secondary coils 166' and 165', and primary coils 166 and 165. The D. C. power pack 74 is directly connected to the generator 135.

Although but one embodiment of the present invention has been illustrated and described, it will be apparent to those skilled in the art that various changes and modifications can be made therein to fit other types of harvesters without departing from the spirit of the invention or the scope of the appended claims.

It is claimed and desired to secure by Letters Patent:

1. A photoelectric steering device for use in a harvester comprising a control system with a source-detector cell pair that gives an error signal when the amount of an uncut crop between the source and detector cell varies, consisting of a photoconductive cell detector with a peak response in the infrared wave length region of 2 to 5 microns that has a longer wave length than that of daylight and a shorter wave length than that of radiation by objects exposed to sunlight, a small sensitive area for said cell, a lightproof casing around said cell except for a narrow, tubular opening in front of said cell sensitive area, a screen closing the interior end of said tubular opening except for an aperture of the same size as said cell sensitive area and placed immediately in front of it, a first infrared transmitting optical system positioned at the exterior end of said tubular opening at its focal length from said screen aperture and with its optic axis passing through the center of said aperture, so that only infrared rays parallel to the optic axis of said first optical system are brought to a focus at said aperture and are incident upon said sensitive cell area, a source case, a tubular opening in said case that is opposite the tubular opening in said detector cell case, and separated by a small gap therefrom, an infrared transmitting optical system in said source case, a Nichrome coil positioned at the focal point of said source optical system, and means for varying the voltage on said Nichrome coil so that its radiation peaks at the same infrared wave length at which said photoconductive cell has peak response, so that the combination of source and detector selectivity with the given optical system geometry allows the detection against a daylight background of variations in the source beam produced by an uncut crop.

2. A photoelectric steering device for use in a harvester comprising a control system with a source-detector cell pair that gives an error signal when the amount of an uncut crop between its source and detector cell varies, consisting of a photoconductive cell detector with a peak response in the infrared wave length region of 2 to 5 microns that has a longer wave length than that of daylight and a shorter wave length than that of radiation from objects exposed to sunlight, a small sensitive area for said cell, a lightproof casing around said cell except for a narrow, tubular opening in front of said cell-sensitive area, a screen closing the interior end of said tubular opening except for an aperture of the same size as said cell sensitive area and placed immediately in front of it, an infrared transmitting lens positioned at the exterior end of said tubular opening at its focal length from said screen aperture and with its optic axis passing through the center of said aperture, so that only infrared rays parallel to the optic axis of said first lens are brought to a focus at said aperture and are incident upon said sensitive cell area, a source case, a tubular opening in said source case that is opposite the tubular opening in said detector cell case and separated by a small gap therefrom, an infrared transmitting lens in said source case, a Nichrome coil positioned on a second optical axis at right angles to that of said lens, a narrow, streamlined case centered on said second optical axis which is in the direction of harvester motion, a mirror positioned to reflect infrared rays from said Nichrome coil along the optic axis of said second lens, said small Nichrome source being positioned at the focal distance from said second lens so that a nearly parallel infrared beam leaves said second lens parallel to its optic axis, a screen between said mirror and said Nichrome coil that limits the infrared rays incident on the mirror to those that just cover said second lens thus preventing unnecessary heating of the mirror with resultant radiation therefrom in the 2 to 5 micron range, and a variable voltage control means in series with said Nichrome coil for adjustment of its temperature to the value for which the radiation from said Nichrome coil will peak at the same infrared wave length for which said photoconductive cell has a peak response so that the combination of the peak wave length selectivity of the source and detector cell with the geometric selectivity of the source and detector optical systems, permits detection against daylight background of variations of the source beam produced by the uncut crop.

3. A photoelectric steering device for use in a harvester comprising a control system that guides the harvester on an uncut crop boundary consisting of an error detector comprised by two source-detector cell pairs, the first positioned above the uncut crop as a diffuse illumination level reference, and the second pair positioned so that an uncut crop obstructs the optical path between the source and detector cell elements, pick-off resistors with the detector cells of said source-detector cell pairs, an output circuit in which said pick-off resistors are connected in series with opposite polarities across the input of an amplifier with an output proportional to the input, common voltages on both the source elements and detector cells of said source-detector cell pairs that prevent unequal voltage output fluctuations that would be caused by voltage variations in different voltage sources, a three position relay and a followup potentiometer connected in series with the output of said amplifier so that the voltage polarity on said relay changes sign at the point where the voltage pickoff from said potentiometer is just equal in magnitude and opposite in polarity to that on the output of said amplifier, a reversible servo motor driven in the direction determined by the position of said three position relay, a guide wheel connected to the variable contact of said followup potentiometer and driven by said servo motor in a direction to keep the pickoff voltage of said potentiometer equal in magnitude and opposite in polarity to the output voltage of said amplifier so that the deflection of the guide wheel is proportional to the error signal for the position of said harvester relative to the uncut plot boundary.

4. A photoelectric steering device for use in a harvester comprising a control system that guides the harvester along the boundary of an uncut crop, comprised by a first and a second infrared source-detector cell pair, each of said pairs being composed of a heated Nichrome coil as source, an optical system that produces a narrow infrared beam of parallel rays, a photoconductive cell detector whose peak response lies at an infrared wave length at which said Nichrome coil has peak output, a second optical system for focusing said parallel beam of infrared on said cell, and an aperture in a screen positioned at said point image of said parallel beam which excludes all rays not parallel to the axis of said parallel beam, the first of said source-detector cell pairs being pisitioned above the uncut crop as a reference and the second positioned so that normally the uncut boundary is in a median position between said source and said cell, a common voltage source being impressed in parallel on said reference and uncut boundary position source-detector cell pair circuits, each containing in series a detector cell element, a variable resistor for calibration and adjustment, a fixed resistor, an amplifying tube whose input circuit contains said fixed resistors of said reference and uncut boundary position detector circuits in series with their IR drops opposed that gives an input signal proportional to the position error of said harvester, with changes in voltage, temperature and background illumination cancelling out for the reference and boundary detection source-detector cell pairs, a bias battery that bucks out the output voltage of said tube for zero input, and a followup potentiometer whose output is bucked against the output of said tube and bias battery, in series with a three position polarized reversing relay, a reversible servo motor connected to a power source through said reversible relay, a guide wheel, means for deflecting said guide wheel by said servo motor, a contact arm of said potentiometer mounted on the shaft of said guide wheel so that the output voltage of said potentiometer is proportional to the deflection of said guide wheel and any difference in voltage between the outputs of said potentiometer, and bias battery and amplifier circuit, actuates said relay to connect said servo motor in a direction to make said voltage difference zero so that the course correcting deflection of said guide wheel is proportional to the positional error of said harvester.

5. In a photoelectric steering device for use in a harvester, a control system for guidance on an uncut crop boundary, comprised by the combination of a first and a second infrared source-detector cell pair, one of said pairs being above and the other below the top of an uncut crop level with the output resistors of said first and second cell pairs opposed in polarity in order to buck out the daylight illumination signals common to both of said source-detector cell pairs but to detect any shift of an uncut boundary from the median gap position between a source and detector cell of said lower source-detector cell pair, an amplifier whose input is in series with said output resistors, a followup potentiometer, a guide wheel connected to the pickoff arm of said potentiometer with deflection proportional to that of said potentiometer, a comparison circuit with the outputs of said amplifier and said potentiometer in series with opposed polarities, a three position relay in said comparison circuit in series with said potentiometer and amplifier outputs whose direction of closure is dependent upon the polarity of the resultant voltage in said comparison circuit, a servomotor energized by said relay in such a direction to keep the potentiometer pickoff voltage equal to the voltage output from said amplifier for increasing magnitude of a position error signal of said harvester, and a rate of correction signal that is operative for decreasing magnitudes of error voltage on the output of said amplifier and that maintains the rate of decrease in magnitude of said error voltage at a reference value by adding a corrective bias voltage in series with the output of said amplifier in order to make a rapid correction proportional to the error for increasing error and a slow correction for deceasing error to bring the harvester back on course in a smooth glide at a small angle to an uncut boundary.

6. In a photoelectric steering device for use in a harvester, a control system for guidance on an uncut crop boundary, comprised by the combination of a first and a second infrared source-detector cell pair, one of said pairs being above and the other below the top of an uncut crop level with their output resistors opposed in polarity in order to buck out the daylight illumination signals common to both of said source-detector cell pairs but to detect any shift of the uncut boundary from the median gap position between the source and detector cell of said lower source-detector cell pair, a first amplifier whose input is in series with said output resistors, a followup potentiometer, a guide wheel connected to the pickoff arm of said potentiometer with deflection proportional to that of said potentiometer, a comparison circuit with the output voltages of said first amplifier and said potentiometer in series with opposed polarities, a three position relay in said comparison circuit in series with said potentiometer and said first amplifier outputs whose direction of closure is dependent upon the polarity of the resultant voltage in said comparison circuit, a servomotor energized by said relay in a direction to keep the potentiometer pickoff voltage equal to the voltage output from said first amplifier for increasing magnitude of error signal, and a rate of correction circuit that cuts in a bias voltage in series with the output voltage of said first amplifier of the proper phase and magnitude to maintain the rate of decrease in magnitude of an error voltage equal to a reference value to produce a smooth, glide correction nearly parallel to the boundary of an uncut crop, said correction circuit consisting of a second amplifier that by means of a common cathode output resistor gives a voltage output proportional to the magnitude of said error voltage regardless of its sign, a conventional resistance-capacity network to differentiate said magnitude of said error voltage, a reference potentiometer in series with and bucked against the output of said resistance-capacity network and in series with a comparison output resistor whose voltage is equal to the difference in the rate of change of the magnitude of said error signal and a voltage from said reference potentiometer, a third amplifier for an output of said comparison output resistor, a gating tube in series with the output of said third amplifier that for decreasing magnitude of error signal allows current flow through a primary of a correction feedback transformer, whose secondary adds a correction voltage in series with the output of said first amplifier.

7. A photoelectric steering device for use in a harvester, comprising a control system consisting of four source-detector cell pairs with photoconductive cell detectors that discriminate against daylight in favor of infrared in the 2 to 5 micron range, apertures in front of the cells of said detectors that allow only the infrared from parallel beams perpendicularly incident on the detector optical system to come to a focus at said apertures and to fall on the sensitive surfaces of said cells, sources of parallel beams of infrared, said parallel beams of infrared being positioned symmetrically about the perpendiculars to said optical systems of said cells, means for adjusting the temperature of said sources for peak infrared output for a wave length for which said photoconductive cell detectors have a peaked response, indicating sets of two source-detector cell pairs one source-detection cell pair being placed above the top of an uncut crop and connected in series with and opposed in polarity to the output of another source-detector cell pair placed below the top of an uncut crop, for discrimination against common daylight illumination, a first amplifier whose input is connected across said opposed outputs of said upper and lower source-detector cell pairs, one of said indicating sets of said source-detector cell pairs whose output gives an error signal proportional to the deviation of the uncut boundary from its median position between the source and detector cell elements of one of said lower source-detector cell pairs, a followup potentiometer, a guide wheel, connections between said potentiometer and guide wheel that give them proportional deflections, a three position reversing relay switch in series with said potentiometer terminals and the output of said amplifier, with the output voltages of said potentiometer and said first amplifier in series opposition so that no voltage appears across said relay when said voltage magnitudes are equal, a servomotor connected to a voltage source through said relay switch, and a drive system between said servomotor and said drive wheel that rotates said guide wheel and said potentiometer until the voltage from the pickoff leads from said potentiometer is equal and opposite to the output of said amplifier, a transformer secondary in series with said first amplifier, followup potentiometer and relay reversing switch, that injects a bias voltage that maintains the rate of decrease of the magnitude of the harvester position error voltage equal to a fixed reference voltage value, so that the harvester approaches the on-course position in a smooth glide nearly parallel to the uncut crop boundary, a bias control circuit for said transformer consisting of a second amplifier for the error voltage magnitude regardless of its polarity, a resistance-capacity network that differentiates the output of said amplifier, a second potentiometer whose reference voltage output is in series with the voltage output of said resistance-capacity network and a pickoff resistor, the polarities of said second potentiometer and said resistance-capacity network being opposed, a third amplifier with an input across said pickoff resistor and an output to a gating tube that allows correction current to flow through a primary of a feedback transformer to insert a correction voltage from a secondary of said transformer in series with three position relay when the gating voltage on said third amplifier is positive as occurs for a decreasing magnitude of error signal from said resistance-capacity network, the proper polarity of correction voltage being obtained for the given polarity on said three position relay by a fourth amplifier with an input across said three position relay to pass current through a primary of said transformer with the proper winding polarity sense to give the proper polarity of correction, and a second indicating set of source-detector cell pairs indentical with the first but placed well within an uncut boundary so that it always has uncut crop between its source and detection cell except when running out of an uncut plot at a corner, when said second indicating set furnishes a voltage signal as long as said harvester is out of an uncut crop, a fifth amplifier for the output of said second indicating set of source-detector cell pairs, connected to the output of said amplifier, solenoid means connected to actuating voltages by said relays, and clutches operated by said solenoid means when said harvester runs out of an uncut crop, the first of said clutches for disengaging said guide wheel from said servomotor and connecting it to follow an engine driven control cam in a preset turn, said second indicating set of source-detector cell pairs furnishing a signal when an uncut crop is again encountered that returns all of said turn actuated clutches to their original positions before said preset turn so that said harvester will make an automatic preset turn at each corner of an uncut plot.

8. In a photoelectric steering device for use in a harvester the combination of a boundary control system that guides said harvester along a substantially straight or gently curving uncut boundary, a programmed corner turn system, and control apparatus that at a corner transfers from harvester guidance by said boundary control system to said programmed turn guidance until the turn is completed and an uncut crop again encountered, consisting of two sets each of two infrared source-detector cell pairs, each of said pairs being comprised by a source far removed in wave length from reflected daylight and infrared radiated from objects at summer heat, a first optical system forming a narrow beam of parallel infrared rays, a second optical system that intercepts said parallel infrared beam, a small aperture in a screen positioned at the center of the focal plane of said second optical second optical system, and a photoconductive cell with its sensitive area covering said aperture and with a peak response at the infrared wave length at which said infrared source peaks, each set of two source-detector cell pairs having one of the pairs above an uncut crop for a reference and having a lower source-detector cell pair, respectively straddling the edge of an uncut plot for control of a circuit for guidance of the harvester along an uncut boundary, or in an uncut crop for control of a circuit that produces a programmed turn at a corner of an uncut plot, the output of the reference and the lower pairs of a given set of source-detector cell pairs being bucked against each other and the difference impressed on suitable amplifiers for relay and solenoid operation of required clutches for control of a guide wheel of said harvester in one of the above types of guidance, the absence of an uncut crop from the lower pair of one set of source-detector cell pairs actuating an amplifier and relay to switch guide wheel control servos from said circuit for guidance along an uncut boundary to said circuit for a programmed turn at a corner of an uncut plot and in the presence of an uncut crop to switch the guide wheel control servos back on to said circuit for guidance along an uncut boundary.

9. In a photoelectric steering device for use in a harvester, a programmed corner turn system consisting of a first and a second infrared source-detector cell pair, the first source-detector cell pair being positioned above an uncut crop for a reference value of daylight illumination voltage output, and the second source-detector cell pair being positioned for partial obstruction of its source by an uncut crop, an output resistor in series with each detector cell of a said source-detector cell pair, a signal pickoff circuit from said resistor outputs in series, bucked output voltages from said resistor outputs that give resultant signals of opposite polarity for the presence and absence of an uncut crop between the source and detector cell of said second source-detector cell pair, a clutch that disengages a right hand wheel from a traction drive and a guide wheel from a boundary guidance system, relay, solenoid, and clutch means actuated by a resultant turn signal from said source-detector cell pairs, a guide wheel control circuit actuated by said means comprising a guide wheel, a lever arm attached to said guide wheel, a pin in the end of said lever arm, a cam mounted on said harvester for engagement of its contour by said pin, a spring attached between a guide wheel axle supporting shaft and a frame member of said harvester that holds said pin against said cam, a drive for said cam that rotates it at the same angular rate as said harvester in its programmed turn, said cam being shaped to deflect said lever arm and said guide wheel by an angle, $\beta = \tan^{-1} d/R$, where $d$ is the perpendicular distance from the center of the axis of the drive wheels of said harvester to said mounting shaft for said guide wheel, and R is the radius of curvature of said harvester turn path at any instant, in order that said harvester shall follow the prescribed turn path of instantaneous radius R, a second pin mounted on said cam near the rim, a microswitch momentarily closed by the passage of said pin at the end of the curved portion of said turn, and means actuated by said microswitch to stop the cam drive at this end point in its rotation cycle and to reengage a clutch for the right hand drive wheel.

10. A photoelectric steering device for use in a harvester, comprising a control system with an automatic shut-down apparatus actuated upon completion of the harvesting of an assigned plot, said apparatus consisting of a first and a second infrared source-detector cell pair that discriminate against background daylight illumination, each comprised of a photoconductive cell detector with a peak response at an infrared wave length far removed from diffusely reflected daylight and radiation emitted by objects at summer temperatures, a screen in front of said photoconductive cell, an aperture in said screen of the same area as the cell sensitive surface and positioned to register with said surface, an optical system for said detector cell with its focal point coincident with said aperture so that only rays parallel to the optical axis of said cell optical system fall upon said sensitive area, a source optical system positioned opposite to said cell optical system, an approximate point infrared source at the focal point of said source system that forms a parallel beam of infrared, a variable resistance in series with said source which is used to adjust the temperature of said source until the peak output is at the infrared wave length at which said cell has a peak response, said first source-detector cell has a peak response, said first source-detector cell pair being positioned above the uncut crop, and said second source-detector cell pair being positioned at such a height that the path of said infrared beam is partially obstructed by the uncut crop at the front of said harvester, output resistors in series with each detector cell of said source-detector cell pair and opposed in polarity, an amplifier whose input is in series with said output resistors and whose output tube is biased to cutoff for an uncut crop partially obstructing said second source-detector cell pair, a first relay actuated by said amplifier output, means for executing a programmed turn energized by said first relay, a second relay actuated by said amplifier after a given delay, to open an ignition circuit of said harvester if an uncut crop is not present in the harvester path for a time somewhat longer than that required for a programmed turn.

11. In a photoelectric steering device for use in a harvester, the combination of a programmed turn system comprised of two infrared source-detector cell pairs, each consisting of an infrared source of parallel rays, a photoelectric detector cell with a peak response at an infrared wave length at which said infrared source peaks, a detector cell optical system positioned in the path of said parallel infrared rays, and a screen aperture in front of said detector cell and positioned at the focal length of said optical system which allows only rays parallel to the rays from said source to fall on said cell, the first of said source-detector cell pairs being positioned above an uncut crop and the second being at a height to be obstructed by an uncut crop, output resistors of said first and second detector cell pairs being bucked in polarity and connected in series with the input of an amplifier whose output stage is biased to cutoff until the outputs of said first and second detector cell pairs no longer balance which occurs in the absence of an uncut crop at the corner of an uncut plot, relays in series with the output of said amplifier, a guide wheel control circuit for following an uncut crop open circuited by said relays and a programmed turn control circuit completed by said relays when said relays are actuated by the output of said amplifier, said programmed turn circuit being comprised by a guide wheel for said harvester and a cam driven by a power source on said harvester that positions said drive wheel, said cam being shaped to produce a deflection of said guide wheel proportional to angle $\beta = \tan^{-1}(d/R)$, where $d$ is the perpendicular distance from the center of the front wheel axis of said harvester to the axis of said guide wheel, and R is the radius of the turn curve to be followed by the harvester at that instant, and a solenoid to slip the clutch of a drive wheel of said harvester that turns on a smaller radius of said turn, a microswitch closed by a desired maximum motion of said cam that releases a clutch driving said cam and allows said guide wheel to be pulled back into a normal position by spring action upon completion of the curved portion of said programmed turn so that said harvester will then continue on a straight line until an uncut crop is again encountered by the second detector cell pair and in the absence of a signal from the outputs of said first and second detector cell pairs said relay is pulled by spring action to open said programmed turn circuit and to close said guide wheel control circuit for guidance of the harvester on the edge of an uncut crop.

References Cited in the file of this patent
UNITED STATES PATENTS

| | | |
|---|---|---|
| 1,490,127 | Peters | Apr. 15, 1924 |
| 1,721,605 | Schauman | July 23, 1929 |
| 2,070,832 | Johnson | Feb. 16, 1937 |
| 2,074,251 | Braun | Mar. 16, 1937 |
| 2,088,676 | White | Aug. 3, 1937 |
| 2,177,803 | Ferte et al. | Oct. 31, 1939 |
| 2,331,144 | Sitter | Oct. 5, 1943 |
| 2,502,468 | Marihart | Apr. 4, 1950 |
| 2,509,914 | Goodwine | May 30, 1950 |
| 2,521,262 | Smith | Sept. 5, 1950 |